US012710117B2

(12) United States Patent
Gupta

(10) Patent No.: US 12,710,117 B2
(45) Date of Patent: Aug. 18, 2026

(54) METAL SEAL WELD-ON CONNECTOR FOR CONDUCTOR CASING

(71) Applicant: UNITED DRILLING TOOLS LTD., Noida (IN)

(72) Inventor: Pramod Kumar Gupta, Noida (IN)

(73) Assignee: UNITED DRILLING TOOLS LTD., Uttar Pradesh (IN)

( * ) Notice: Subject to any disclaimer, the term of this patent is extended or adjusted under 35 U.S.C. 154(b) by 0 days.

(21) Appl. No.: 17/794,014

(22) PCT Filed: Jan. 20, 2021

(86) PCT No.: PCT/IB2021/050405
§ 371 (c)(1),
(2) Date: Jul. 20, 2022

(87) PCT Pub. No.: WO2021/148951
PCT Pub. Date: Jul. 29, 2021

(65) Prior Publication Data

US 2023/0037968 A1 Feb. 9, 2023

(30) Foreign Application Priority Data

Jan. 20, 2020 (IN) ............................. 202011002427

(51) Int. Cl.
*F16L 15/00* (2006.01)

(52) U.S. Cl.
CPC ................................. *F16L 15/003* (2013.01)

(58) Field of Classification Search
None
See application file for complete search history.

(56) References Cited

U.S. PATENT DOCUMENTS 4,722,391 A 2/1988 Llc
5,146,984 A 9/1992 Corp
5,505,502 A 4/1996 Company
2007/0039149 A1* 2/2007 Roussie ................ F16L 15/003
403/258

(Continued)

FOREIGN PATENT DOCUMENTS

EP 0454147 A2 10/1991

OTHER PUBLICATIONS

Publication 3: Oil States Industries (UK) LTD., "Swift DW2 Gas Tight (GT) Connection", 2012, https://oilstates.com/wp-content/uploads/Swift-Gas-Tight-Connection.pdf, retrieved from a snapshot dated Aug. 21, 2017 via Internet Archive Wayback Machine https://web.archive.org/web/20170821114158/https://oilstates.com/wp-content/uploads/Swift-Gas-Tight-Connection.pdf accessed on Apr. 4, 2023.†

(Continued)

*Primary Examiner* — Aaron M Dunwoody
(74) *Attorney, Agent, or Firm* — S.J. Intellectual Property LTD

(57) ABSTRACT

The present invention relates to an improved weld-on connector to achieve 5 high tensile strength, burst pressure and collapse pressure. The present invention relates to the metal seal weld-on connector for conductor casing with different types of sealings and several other designed features to provide an improved strength for the threaded connection.

9 Claims, 2 Drawing Sheets

(56) References Cited

U.S. PATENT DOCUMENTS

| | | | | |
|---|---|---|---|---|
| 2014/0262213 | A1* | 9/2014 | Delange | F16L 15/003<br>166/207 |
| 2017/0198839 | A1 | 7/2017 | Us | |
| 2018/0266593 | A1* | 9/2018 | Glukhih | F16L 15/06 |
| 2019/0056049 | A1* | 2/2019 | Kawai | F16L 15/04 |

OTHER PUBLICATIONS

Publication 4: Business Standard, “United Drilling gains on bagging design patents in UK,” Dec. 29, 2021, https://www.business-standard.com/article/news-cm/united-drilling-gainson- bagging-design-patents-in-uk-121122900675_1.html accessed on Apr. 4, 2023.†

Publication 5: United Drilling Tools LTD, “Swift”, 2013, http://www.udtltd.com/32-Swift.html, retrieved from a snapshot dated Sep. 18, 2013 (specification table retrieved from a snapshot dated Aug. 9, 2016) via Internet Archive Wayback Machine https://https://web.archive.org/web/20130918003904/http:/www.udtltd.com/32-Swift.html accessed on Apr. 13, 2023.†

Publication 6: United Drilling Tools LTD, “UDT Swift”, 2021, https://udtltd.com/home-1-2/udt-swift/ accessed on Apr. 4, 2023.†

Publication 1: Oil States Industries, “Swift Connector”, 2017, https://oilstates.com/risersystems- conductor-solutions/conductors/swift-connector/, retrieved from a snapshot dated Jun. 12, 2017 via Internet Archive Wayback Machine https://web.archive.org/web/20170612211238/http://oilstates.com/riser-systems-conductorsolutions/conductors/swift-connector/ accessed on Apr. 5, 2023.†

Publication 2: Oil States Industries, “Riser, Drilling &Production Systems Standard Connectors”, Sep. 2013. https://oilstates.com/wp-content/uploads/Advanced-Connection-Systems.pdf, retrieved from a snapshot dated Aug. 19, 2017 via Internet Archive Wayback Machine https://web.archive.org/web/20170819212933/https://oilstates.com/wpcontent/ uploads/Advanced-Connection-Systems.pdf accessed on Apr. 4, 2023.†

* cited by examiner
† cited by third party

METAL SEAL WELD-ON CONNECTOR FOR CONDUCTOR CASING

FIELD OF THE INVENTION

The present invention relates to an improved connector for conductor casing and other tubular components to achieve high tensile strength, burst pressure and collapse pressure etc. More particularly, the present invention relates to the metal seal weld-on connector for conductor casing with different types of sealings and several other designed features to provide significant improvements in various properties like tensile strength, burst pressure, collapse pressure etc.

BACKGROUND OF THE INVENTION

The most complex component of a tubular joint is the threaded connection used to attach adjacent tubes. These connections usually meet or surpass the internal pressure and external pressure performance properties of the tube body. A typical tubular member used in oil and gas industry has a pin connector welded on one end and a box connector welded to the other end and strings of such tubular elements are made by threading these with connectors one over the other etc. Such weld-on connectors are used for example for conductor casing.

Reference to the tubular members here includes casing pipes used in oil and gas industry. There are several problems to which weld-on connectors can give rise during drilling and during subsequent operation of the well. These large diameter weld-on connectors are required to provide very good tensile strength, good performance against internal and external fluid pressures in the well during drilling and later on, requirement of thread teeth not jumping out when subjected to very large bending forces, meeting performance parameters even after several heat-cold cycles and other several stringent requirements.

EP0454147A2 discloses the truncated buttress type thread form incorporating a reverse-angle tension load flank with a compression flank. The pin thread is comprised of a crest, a root having a length, a load flank and a stab flank. The load flank makes an angle A to a line drawn perpendicular to the axis of the thread such that the crest overhangs the root, forming what is known as a "hooked thread." The stab flank forms an angle B to a line drawn perpendicular to the axis of the thread. The angle B is chosen so that the included angle C formed by the load flank and the stab flank is greater than zero degrees. The main drawback of the invention is that the cost of producing these types of threads is quite expensive.

U.S. Pat. No. 4,722,391A discloses a pack-off assembly for a wellhead system including a tapered pack-off mounted on a pack-off nut which has multi-start threads for engaging similar mating multi-start threads on a casing hanger (C). The casing hanger (C) is provided with a taper which faces the surrounding cylindrical wall of the wellhead (W) thus providing a tapered annulus. The pack-off, being tapered, is moved into the tapered annulus by rotation of the pack-off nut where the pack-off engages an abutment and is compressed and expanded into sealing engagement with the internal and external surfaces on the wellhead (W) and casing hanger (C).

The main drawback of the invention is that the sealing done by only elastomeric ring does not make the connector have better sealing effect as sometimes the ring leads to misalignment that leads to weak sealing effect.

US20170198839A1 discloses ends of separate tubular members used in oil and gas drilling are connected pin-to-pin by a threaded coupling and made leak tight by an internal pressure seal, wherein the male or field end pin of a first tubular member has an integral geometry designed to mate with the female or mill end pin of a second tubular member. The coupling and tubular members possess a modified buttress thread form having a negative load flank angle and a positive stab flank angle. When assembled, the coupling connects the field end pin of the first tubular member with the mill end pin of the second tubular member, wherein integral geometries of the mated pin ends generate the interference necessary to produce a single, metal-to-metal, leak-tight, internal contact pressure seal. The main drawback of the invention is that a single sealing is provided to control the internal pressure which may lead to the less life of the tubular members.

U.S. Pat. No. 5,146,984A discloses a device for connecting between two tubular members that are inserted in an oil and gas earth well in a manner to permit a quick release, yet prevent relative rotation between the tubular members. The device is adapted to pass fluid between the tubular members in their connected position. The main drawback of the invention is that the device is used which prevents relative rotation between the members sometimes lead to jamming of device.

Therefore, there is a need for a weld-on connector with multiple sealing effective in harsh environment and also protects the connector against excessive torque and localised over stress.

OBJECT OF THE INVENTION

The main object of the present invention is to provide an improved metal seal weld-on connector for conductor casing to achieve high tensile strength, burst pressure and collapse pressure performance.

Another object of the present invention is to provide a weld-on connector having three different types of sealing wherein, a first sealing is provided by an integral metal-to-metal seal within the connector, a second sealing is provided by an elastomeric O-ring within the connector and a third sealing is provided by a face to face sealing over the load flank surfaces of thread.

Yet another object of the present invention is to provide a weld-on connector with a face to face sealing area wherein the first of the face to face sealing area is effected over the load flanks of the thread and second of the face to face sealing area is effected by the protruding part near the free end of the pin member.

Yet another object of the present invention is to provide an improved weld-on connector having a box member and a pin member with a sealing area to obtain three different types of sealings.

Still another object of the present invention is to provide a weld-on connector having three different types of sealing by designing radial interference between an outer surface of pin connector and an inner surface of box connector.

SUMMARY OF THE INVENTION

The present invention relates to an improved weld-on connector to achieve high tensile strength, burst pressure and collapse pressure. More particularly, the present invention relates to an improved weld-on connector for conductor casing having three different types of sealing of connectors to provide an improved strength for the threaded connection.

In a main embodiment, the present invention provides an improved weld-on connector comprising a box member and a pin member coupled together. The box member is provided with an internal thread at a tapered inner surface and a sealing area and the pin member is provided with a sealing area, a groove for locating an O-ring and a matching external thread at an outer surface tapered to match with the inner surface of the box. The pin member and the box member are coupled together by rotating one member to another with the help of the threads. Said weld-on connector is having three types of sealing wherein a first metal to metal sealing is provided by the sealing area of the pin member and the box member when these two members are threaded together and this sealing opposes the internal pressure of fluids to reach the threads of the connector; a second sealing is provided by an O-ring that does not allow outside fluids to reach the threads of the connector; and a third sealing is provided by a face to face sealing at two different places within the connector wherein a first face- to face sealing is obtained by providing a matching seat in the box member that mates the protrusion in the pin member free end and a second face to face sealing is provided over the load flank surfaces of modified buttress thread. The threads include a modified buttress thread with a stab flank angle of 20-30 degrees, (e.g. 25 degrees) and said connector has a deep stabbing design to eliminate cross threading.

The present invention ensures easy threading of weld-on connector during complete make-up by using multi start threads, better sealing performance against internal and external fluids by using three different types of seals, higher protection against possibility of over torque by designing protruding part of pin member mating against matching seat in box member, and an elimination of the stress concentration points (therefore better protection against galling and cracking related to stress damages) all without compromise on the strength of the weld-on connectors and all features are obtained in each connector for 18.625" and larger diameter.

BRIEF DESCRIPTION OF THE DRAWINGS

An understanding of the system of the present invention may be obtained by reference to the following drawings.

DETAILED DESCRIPTION OF THE INVENTION

Figure 1:
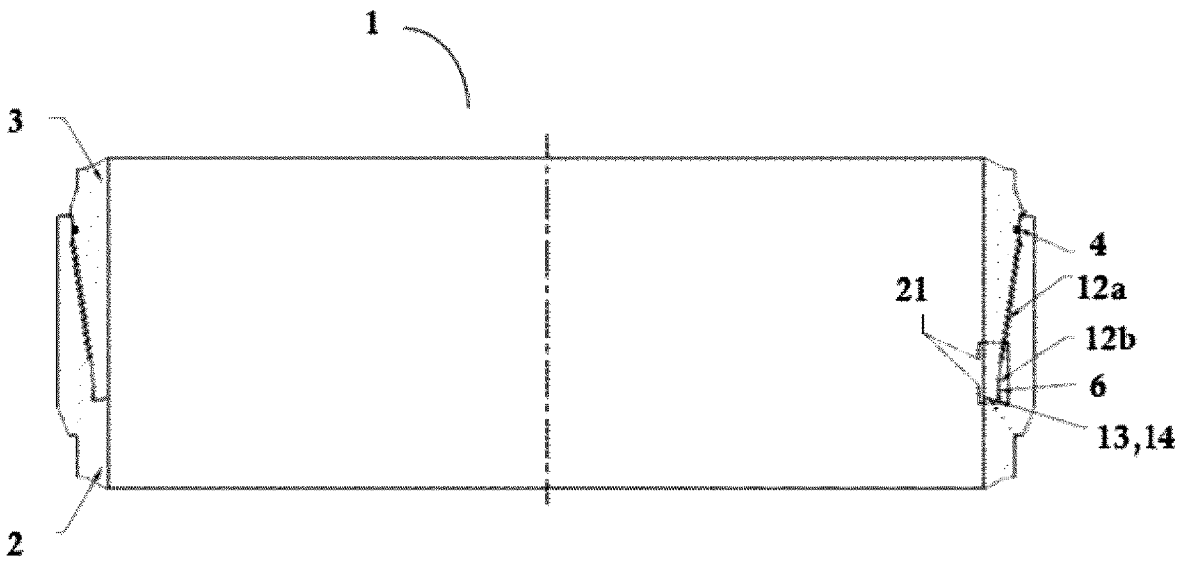
FIG. 1 shows a perspective view of connector assembly in accordance with an embodiment of the present invention.

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

The present invention relates to an improved metal seal weld on connector for conductor casing to achieve high tensile strength, and improved burst pressure and collapse pressure performance values for the connectors. More particularly, the present invention relates to an improved weld on connector with three different types of sealing to provide an improved strength.

In a main embodiment, the present invention provides an improved weld-on connector comprising a box member and a pin member coupled together. The box member is provided with an internal thread at a tapered inner surface and a sealing area and the pin member is provided with a sealing area, a groove for locating an O-ring and a matching external thread at an outer surface tapered to match with the inner surface of the box. The pin member and the box member are coupled together by rotating one member to another with the help of the threads. The first metal to metal sealing is provided by the sealing area of the pin member and the box member when these two members are threaded together and this sealing opposes the internal pressure of fluids to reach the threads of the connector. The second sealing is provided by an O-ring that does not allow fluids to reach the threads of the connector. The threads include a modified buttress thread with a stab flank angle of 20-30 degrees (e.g. 25 degrees) and said connector has a deep stabbing design to eliminate cross threading. The third sealing is provided by a face to face sealing at two different places within the connector. The first face to face sealing is obtained by providing a matching seat in the box member that mates with the protrusion in the pin member free end and a second face to face sealing is provided over the load flank surfaces of modified buttress thread.

Now referring to FIG. 1, the present invention shows the improved weld-on connector assembly for conductor casing. The connector 1 comprises of a circular box member 2 and a circular pin member 3. The box member 2 is coupled to the pin member 3 with the help of threads. The three types of sealing is provided on the connector wherein the first metal to metal sealing is provided over a tapered surface near a free end of the pin member 3 that protects the threads of the connector from the fluids flowing inside the pin member 3. The second sealing is provided by an O-ring 4 located in a groove 5 in the connector that protects the threads from the fluids flowing outside the connector. The threads of the connector 1 include a modified buttress thread with a stab flank angle of 20-30 degrees (e.g. 25 degrees). The threads of the connector 1 are preloaded for fatigue and said connector has a deep stabbing design 6 to eliminate cross threading. The third sealing is provided by a face to face sealing at load flank surface 12*a* and a face to face sealing 12*b* at different places within the connector. The first face to face sealing at 12*b* is effected by providing a matching seat 14 in the box member 2 that mates with the protrusion 13 on the free end of the pin member 3. A second face to face sealing is effected over the load flank surfaces 12*a* of modified buttress thread. The connector assembly 1 has mating portion 21.

Figure 2:
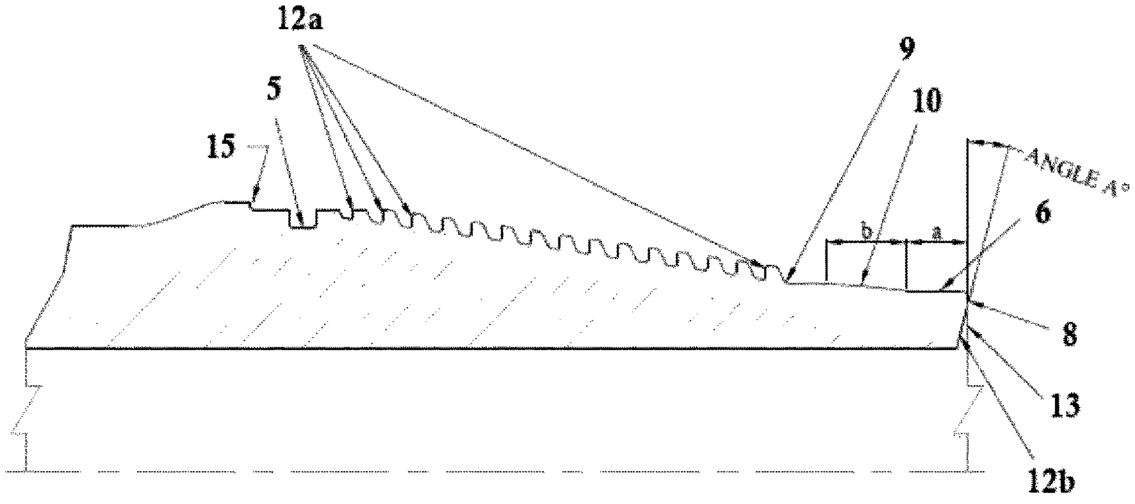
FIG. 2 shows a half sectional view of the box member in accordance with an embodiment of the present invention.

Now referring to FIG. 2, the present invention shows the assembly of the pin member 3. The pin member 3 has threads i.e. external threads at a tapered outer surface and a sealing area 10. The pin member 3 has an indicator shoulder 15. The box member 2 and the pin member 3 are hollow from inside and allow flow of fluid from inside the connector members. This connector 1 is a heavy duty connector for use where high strength and pressure integrity are important. The three different types of sealing are provided wherein the first seal is a metal- to metal seal and a second seal is by an elastomeric O-ring. Both the sealing is affected when the sealing area of the box and pin members are fully threaded. The first sealing is provided by an integral metal- to metal seal within the connector. The metal- to metal sealing is effected near the free end of the pin member 3 and when the sealing areas 10 of the pin member 3 and the box member 2 are fully threaded. This first sealing is done against the internal pressure of fluids reaching the threads of the connector assembly 1. The second sealing is available from elastomer sealing within the connector 1 and is near the free end of the box member 2 and is provided by an O-ring 4 located in a groove 5 on the pin member 3. The elastomer sealing does not allow fluids external to the connector reaching the threads. The metal-to-metal sealing is achieved by designing radial interference between the outer surface of the pin member 3 and the inner surface of the box member 2. The third sealing is provided by a face to face sealing at load flank surface 12*a* and face to face sealing 12*b* at different places within the connector. There are two face to face sealing wherein a first face to face sealing 12*b* is achieved by providing a matching seat in the box member 2 that perfectly mates the protrusion 13 in the free end 8 of pin member 3 and a second face to face sealing over the load flank surfaces 12*a* of modified buttress thread. The first seal that is metal- to metal seal, is achieved by designing radial interference between the profile of outer surface of the pin member 3 and the profile of inner surface of the box member 2. For this purpose, profiles of both pin and box member are elaborately designed. The outer surface of the pin member 3 over a length 'a', starting from the free end of the pin connector, is straight. After the straight length 'a' to the start of the first thread on the pin member, the surface profile of the outer surface of the pin member 3 is designed using multi-radii taper. Thus, in one example four different high radii segments are joined by a number of small radii segments. In one example, the high radii segments have radius values in the range of 150 to 300 mm, and the small radii segments have radius values in the range of 5 to 15 mm. The inner surface of the box member 2 is designed to ensure radial interference between the outer surface of the pin member 3 and the inner surface of the box member 2 when the connector 1 is fully threaded. The radial interference is designed to be over a range 'b' from a distance 'a' from the free end of the pin member. The modified buttress thread with a stab flank angle of 20-30 degree is used for threads on both pin and box member. The threads of the connector are pre-loaded for fatigue and are multi start to achieve full make-up in few (1 to 2) rotations. The connector 1 has a deep stabbing design to eliminate cross threading and said connector is reused multiple times.

The improved weld on connector is carried out for different conductor casing sizes ranging from 18.625" to 36".

Figure 3:
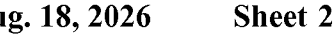
FIG. 3 shows a half sectional view of the pin member in accordance with an embodiment of the present invention.
Figure 3:
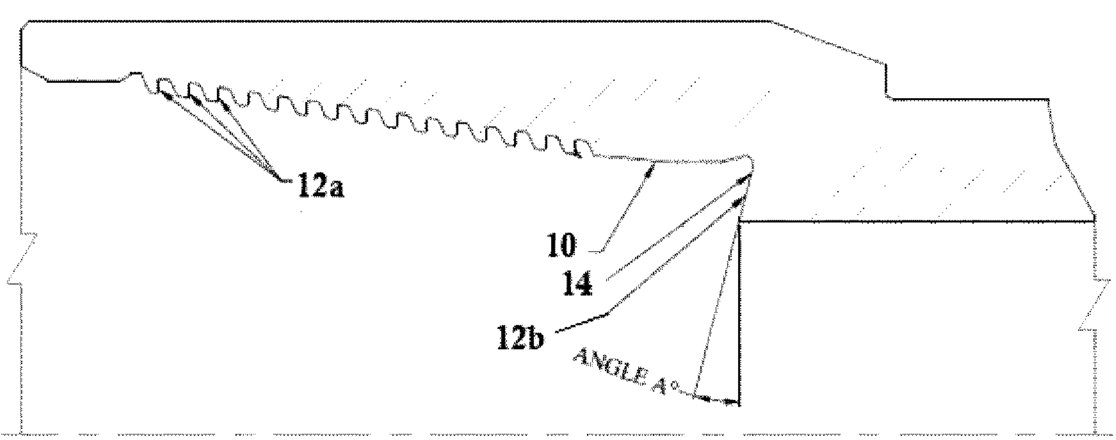

Now referring to FIG. 3, the present invention shows the assembly of the box member 2. The box member 2 has threads i.e. internal threads at inner tapered surface and a sealing area 10. As depicted in FIG. 2, the outer surface of the pin member over a length 'a' starting from a free end 8 of the pin member 3 is straight. After the straight length 'a' to the start of the first thread 9 on the pin member 3, the outer surface of the pin member 3 is designed using multi-radii taper. An O-ring 4 is located in a groove 5 in the pin member. The sealing is provided by the O-ring 4 that protects the threads of the connector 1 from fluids flowing outside. The O-ring 4 seal protects against fluids flowing outside the connector 1 and does not allow outside fluids to reach the threads of the connector and the inside of the connector 1. The third sealing is provided by the face-to-face sealing. The first face to face sealing is effected over the load flank surface 12*a* of the thread and the second face to face sealing 12*b* is effected by the protrusion 13 near the free end 8 of the pin member 3 as it mates with the matching seat 14 in the box member 2 and this sealing is effected when the two connector members 2, 3 are fully made up with prescribed torque. The seating of the protrusion 13 of the pin member 3 in the box member 2 ensures the connector 1 not to be over-torque because the torque suddenly shoots up and this prevents damage to the threads due to breaking of metal and prevents galling. The corners of the protruding part 13 of the pin member 3 are chamfered near its free end 8 and the matching seat 14 in the box member 2 also has smooth curves to ensure no localized over stress points are developed and this prevents metal being over stressed beyond elastic limits.

The integral first of the face-to-face sealing is over load flank surfaces 12*a* of the modified buttress thread with stab flank angle of 20-30 degrees. The second face to face sealing 12*b* is also integral to the connector and is provided by designing the protrusion 13 of the pin member near its free end 8. The angle that protrusion 13 of the pin member makes with a plane perpendicular to the axis of the connector 1 is A° and the value of A lies in the range 10 to 20 degrees.

Figure 4:
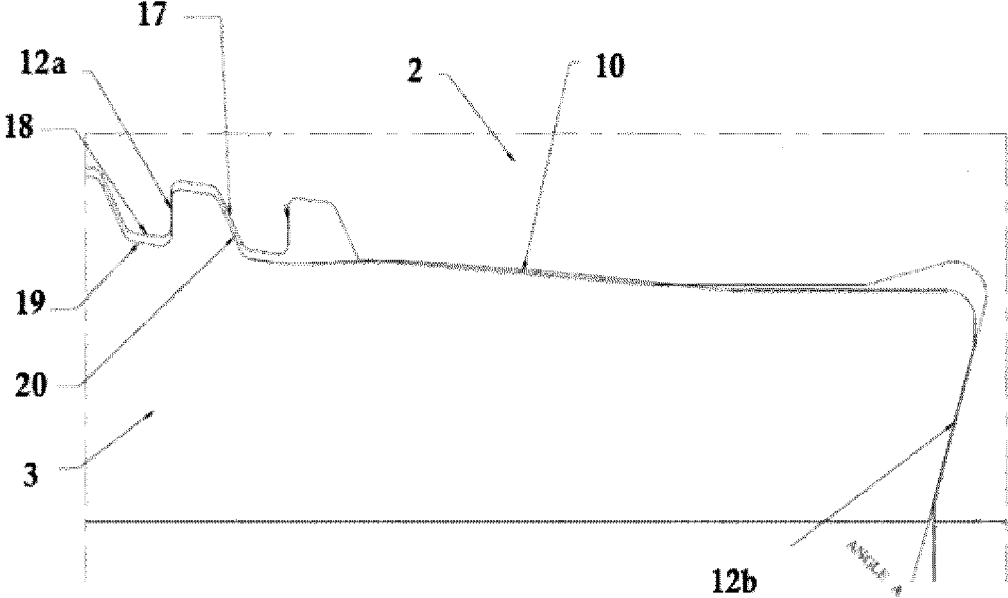
FIG. 4 shows a detailed view of the mating portion in the connector assembly in accordance with an embodiment of the present invention.

Now referring to FIG. 4, the detailed view of mating portion 21 of FIG. 1 is shown, the present invention provides a first face to face seal 12*a* which begins to occur on the load flank surface as the two connector members 2, 3 are further threaded. As the two connector members 2, 3 are threaded the stab flank surfaces meet first. As the connector members 2, 3 are threaded, the first metal to metal seal surfaces causes sealing at sealing surface 10. As the threading of the two connector members 2, 3 further progresses, the load flank surfaces 12*a* cause face to face seal and there are designed precise clearance between the stab flank surfaces and there is a clearance between crest of the threads on the pin member 3 and the root of the thread on the box member 2. The second of face-to-face seal 12*b* is effected by the protrusion 13 near the free end of the pin member 3 as this mates with the designed matching seat in the box member and this seal is effected when the two connector members 2, 3 are fully made-up with prescribed torque. The two connector members 2, 3 are threaded, the stab flank surfaces 17 and 20 meet. As the connector members 2, 3 are threaded, the first metal to metal seal causes sealing and as the threading of the two connector members 2, 3 further progresses the load flank surfaces 12*a* cause face to face seal and there is a clearance between the stab flank surfaces 17 and 20. In this condition, there is clearance between the crest 18 of threads on the pin member 3 and the root of the thread 19 on the box member 2.

Therefore, the present invention provides an improved weld-on connector that provides a higher tensile strength and higher sealing against internal and external fluid pressures in the well during drilling. It provides large diameter weld on assemblies for greater than 18.625" diameter, and also provides protection against excessive torque.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

I claim:

1. An improved weld-on connector (1) for conductor casing comprising:

a circular box member (2) having internal threads at tapered inner surface; and a circular pin member (3) having matching external threads at tapered outer surface fastened on the internal threads of the box member (2);

wherein, said weld-on connector (1) provides a first sealing comprising metal-to-metal seal over a tapered surface near a free end (8) of the pin member (3) to protect the internal threads and the external threads of the connector assembly (1) from fluid flowing inside the pin member (3);

said weld-on connector (1) provides a second sealing provided by an O-ring (4) located in a groove (5) in the pin member (3) to protect the internal threads and the external threads from fluids flowing outside the connector assembly (1);

said weld-on connector (1) provides a face-to-face sealing at two places in connector (1) wherein a face-to-face sealing (12*b*) is effected by providing a matching seat (14) in the box member (2) that mates with a protrusion (13) in the pin member (3) and other face-to-face sealing is effected over load flank surface (12*a*) of the internal threads and the external threads of connector (1); and said internal threads and the external threads are preloaded for fatigue and are multi-start to achieve full make up in 1 to 2 rotations.

2. The improved weld-on connector (1) for conductor casing as claimed in claim 1, wherein, said threads of box member (2) and pin member (3) are modified buttress threads with a stab flank angle of 20-30 degrees and said connector has a deep stabbing (6) to eliminate cross threading.

3. The improved weld-on connector (1) for conductor casing as claimed in claim 2, wherein, said threads have load flank surface (12*a*) and stab flank surface (17) of box member (2) and stab flank surface (20) of pin member (3) with a desired-clearance between them.

4. The improved weld-on connector (1) for conductor casing as claimed in claim 1, wherein, said first metal-to-metal sealing is due to radial interference between the outer surface of the pin member (3) and the inner surface of the box member (2).

5. The improved weld-on connector (1) for conductor casing as claimed in claim 1, wherein, the outer surface of the pin member (3) over a length 'a' from the free end (8) of pin member (3) is straight and further has a surface profile having multi-radii taper.

6. The improved weld-on connector (1) for conductor casing as claimed in claim 1, wherein, the weld on connector (1) is carried out for different conductor casing sizes ranging from 18.625" to 36".

7. The improved weld-on connector (1) for conductor casing as claimed in claim 1, wherein, the protrusion (13) of the pin member (3) seated in the box member (2) ensures that connector (1) does not over-torque and prevents damage to the threads due to breaking of metal and prevents galling.

8. The improved weld-on connector (1) for conductor casing as claimed in claim 1, wherein, the protrusion (13) has chamfered corners near its free end (8) and the matching seat (14) in the box member (2) has smooth curves to ensure no localized over stress points.

9. The improved weld-on connector (1) for conductor casing as claimed in claim 1, wherein, the protrusion (13) of the pin member makes an angle A with a plane perpendicular to the axis of the connector (1) is and the value of A lies in the range 10 to 20 degrees.

* * * * *